US012680932B2

(12) United States Patent
Wu et al.

(10) Patent No.: US 12,680,932 B2
(45) Date of Patent: Jul. 14, 2026

(54) DEVICES AND METHODS FOR DEBRIS FLOW ABRASION TESTING AND METHODS FOR ABRASION QUANTITY EVALUATION OF PREVENTION AND CONTROL ENGINEERING

(71) Applicant: INSTITUTE OF MOUNTAIN HAZARDS AND ENVIRONMENT, CHINESE ACADEMY OF SCIENCES, Chengdu (CN)

(72) Inventors: Fan Wu, Chengdu (CN); Xiaoqing Chen, Chengdu (CN); Jiangang Chen, Chengdu (CN); Wanyu Zhao, Chengdu (CN)

(73) Assignee: INSTITUTE OF MOUNTAIN HAZARDS AND ENVIRONMENT, CHINESE ACADEMY OF SCIENCES, Chengdu (CN)

( * ) Notice: Subject to any disclaimer, the term of this patent is extended or adjusted under 35 U.S.C. 154(b) by 0 days.

(21) Appl. No.: 19/067,847

(22) Filed: Mar. 1, 2025

(65) Prior Publication Data

US 2025/0216307 A1 Jul. 3, 2025

(30) Foreign Application Priority Data

Jan. 1, 2024 (CN) .......................... 202410000020.2

(51) Int. Cl.
*G01N 3/56* (2006.01)
*G01N 3/02* (2006.01)
(Continued)

(52) U.S. Cl.
CPC .................................... *G01N 3/565* (2013.01)

(58) Field of Classification Search
CPC ........ G01N 3/565; G01N 3/567; G01N 33/24; G01N 15/08; G01N 15/082; G01N 3/12;
(Continued)

(56) References Cited

FOREIGN PATENT DOCUMENTS

| CN | 105606466 A | 5/2016 |
| CN | 110346235 A | 10/2019 |

(Continued)

OTHER PUBLICATIONS

Notification to Grant Patent Right for Invention in Chinese Application No. 202410000020.2 mailed on Aug. 15, 2025, 4 pages.
(Continued)

*Primary Examiner* — Brandi N Hopkins
(74) *Attorney, Agent, or Firm* — PORUS IP LLC

(57) ABSTRACT

A device and a method for debris flow abrasion testing and a method for abrasion quantity evaluation of debris flow prevention and control engineering are provided. The device for debris flow abrasion testing of the present disclosure is an improvement of its own patented product, and a testing block box assembly includes a testing block box, an outer side of the box is apertured and centered with an annular member. The annular member is screwed with a fixing member and a placeholder member. The fixing member fixes the testing block and the placeholder member blocks a sampling operation hole to ensure that a bottom of the box is leveled. The testing block box assembly includes a stop member or a disassembling member.

10 Claims, 5 Drawing Sheets

(51) Int. Cl.
G06F 30/25 (2020.01)
G06F 119/14 (2020.01)

(58) Field of Classification Search
CPC ........ G01N 19/02; G01N 17/00; G01N 1/286;
B05D 5/005; Y02A 50/00; G01M 10/00;
G01M 17/02; E02B 7/04; E02B 1/02;
E02B 1/00; G06F 30/13; G06F 30/28;
G06F 30/20; G06F 30/27; E01D 19/02;
F04D 15/0088
See application file for complete search history.

(56) References Cited

FOREIGN PATENT DOCUMENTS

| | | | | | |
|---|---|---|---|---|---|
| CN | 111693453 | A | | 9/2020 | |
| CN | 213829503 | U | | 7/2021 | |
| CN | 113390745 | A | | 9/2021 | |
| CN | 215179538 | U | * | 12/2021 | |
| CN | 113089591 | B | * | 7/2022 | ............ G08B 21/10 |
| CN | 217237395 | U | | 8/2022 | |
| CN | 218725927 | U | | 3/2023 | |
| CN | 116794272 | A | * | 9/2023 | ............ G01N 33/24 |
| JP | H0599824 | A | | 4/1993 | |

OTHER PUBLICATIONS

First Office Action in Chinese Application No. 202410000020.2
mailed on Aug. 6, 2025, 10 pages.

* cited by examiner

DEVICES AND METHODS FOR DEBRIS FLOW ABRASION TESTING AND METHODS FOR ABRASION QUANTITY EVALUATION OF PREVENTION AND CONTROL ENGINEERING

CROSS REFERENCE TO RELATED APPLICATIONS

This application claims priority to Chinese Patent Application No. 202410000020.2, filled on Jan. 1, 2024, the entire content of which is incorporated herein by reference.

TECHNICAL FIELD

The present disclosure relates to a measurement technology of a kinematic feature, in particular to a device and method for measuring physical variables related to debris flow erosion dynamics and a method for abrasion quantity evaluation of debris flow prevention and control engineering realized thereunder, which belongs to fields of a geologic hazard monitoring measurement technology, a technology for measuring material strength features using a mechanical stress, and a technology for geological disaster prevention technology.

BACKGROUND

A debris flow is one of the three major geologic hazards in mountainous regions, which is a key prevention and control target of an environmental management and an ecological security construction in the mountainous region. The debris flow is a typical solid-liquid two-phase flow, including a solid phase referring to solid coarse particles and a liquid phase mainly referring to a mixture of solid fine particles and water. As the geologic hazard, the debris flow is prominently characterized by a high accumulation density, a broad particle gradation, a great particle size, a multiphase coupling, and a strong destructive force on the environment. In the mountainous region, a technical idea of the debris flow prevention and control is to "stability, interception, and discharge", which is specifically realized through the construction of various types of debris flow prevention and control engineering. Traditional debris flow prevention and control engineering is a geotechnical measure, i.e. concrete buildings/structures. Despite the fact that engineering design in recent years has been devoted to introducing ecological measures into control engineering and promoting the ecological measures in combination with geotechnical measures, the concrete structures are still a core part of all types of control engineering. With the rise of the concept of environmental and ecological management and some of the shortcomings exposed in the operation of purely geotechnical measures, in the debris flow prevention and control engineering, the stability and safety of the concrete section of is the core of the stability and safety of the entire project.

The prevention and control engineering structures are often damaged by abrasion due to a collision and rolling friction of coarse particles in the debris flow, and a count of types of debris flow control engineering, including spillway dams, spillway canal lining, and gate piers, are subject to abrasion and damage by debris flows in use and operation. The abrasion and damage at key parts such as a dam top, a bottom of a drainage channel, and side walls are mostly concerned. Evaluating a level of debris flow abrasion in localized critical parts of the geotechnical engineering, as well as the level of debris flow abrasion throughout the entire project, is critical to ensure a long-term safe use and a performance maintenance of the structure, as well as the safety of an engineering protection region.

An effective process of constructing a measurement and evaluation of the abrasion features of debris flow control engineering is to use indoor abrasion testing devices and manners. The most commonly used indoor abrasion testing available primarily includes an underwater abrasion manner (ASTM C1138), a roadway abrasion manner, a (Bohme) abrasion manner, and some improved non-standard abrasion manners. These techniques originate from the field of river dynamics research. As a great difference exists between a fluid feature considered in the testing and the solid-liquid two-phase flow feature of the debris flow, and the corresponding testing device and manner are not suitable for debris flow abrasion testing. For example, a high rotational speed (1200 rpm) utilized in an underwater abrasion testing is significantly different from an actual flow speed of the debris flow (usually less than 10 m/s), and due to a centrifugal force, a center of the concrete sample usually does not produce abrasion damages, which is not in line with actual features of the debris flow motion, and thus is not suitable for the debris flow abrasion testing. Similarly, current conventional abrasion devices are not compatible with the features of a high bulk density, a wide and huge particle gradation, and a multi-phase mixing of the debris flow, which are unable to support a development of debris flow abrasion testing.

Double-axis rolling wear resistance testing device and method capable of simulating channel cross-sectional morphology (Z L2021109404941) developed by the applicant are able to accurately simulate the damage of concrete in debris flow abrasion under a solid-liquid coupling condition. An abrasion morphology obtained in the abrasion testing is very similar to an abrasion morphology of an actual engineering scenario, which solves the technical problem of indoor debris flow abrasion testing. However, there are still two unresolved problems with the technique in solving the evaluation of actual abrasion damage in debris flow prevention engineering. First, the test device is not perfect enough. A concrete testing block fixing structure and operations used in this device, such as pre-buried steel nail samples and surface steel wire fixing manners, are cumbersome in terms of work processes, which affects an experimental efficiency of the testing process. Since small particles of debris flow are likely to embed between samples and instruments, it is very difficult to mount and remove the concrete testing block, which significantly restricts the efficiency of the testing. Moreover, in addition, the pre-buried steel nail samples increase a difficulty of sample production, and in the abrasion process of the surface steel wire fixating manner, the steel wire is subjected to an impact of the debris flow and fractures. Due to a blocking effect of the surface steel wire, the abrasion of the concrete under the steel wire is also affected, thereby affecting the accuracy of the testing. Secondly, the technology has not yet solved the problem of conversion between an indoor abrasion testing data analysis to an on-site engineering abrasion features evaluation, that is to say, the technical problem of on-site evaluation of the degree of abrasion damage in actual prevention and control engineering is not solved yet.

SUMMARY

A purpose of the present disclosure is to provide a technique for debris flow abrasion testing and a method for abrasion quantity evaluation of debris flow prevention and control engineering in response to the deficiencies of the prior art.

To realize the above purposes, the present disclosure firstly provides an improved technical solution based on a double-axis rolling wear resistance testing device and method capable of simulating channel cross-sectional morphology by the applicant.

A device for debris flow abrasion testing, including a motor support base, a dual-axis motor, a disc device, and a testing block box assembly. A main body of the testing block box assembly is a testing block box, the testing block box is an open box, a hole is provided in a bottom of the testing block box, an outer side of the hole is fixed with an annular member, an inner hole of the annular member is provided with inner threads and is centered with the inner hole of the annular member; symmetrical holes are provided on opposite sidewalls of the testing block box, an outer side of each of the symmetrical holes is fixed with an annular member, an inner hole of the annular member is provided with inner threads and is centered with the inner hole of the annular member; and the testing block box assembly further includes a fixing member and a limiting member; the fixing member passes through the annular member on the sidewall of the testing block box from outside to inside and is threadedly connected to the inner hole of the annular member to fix a testing block in the testing block box in an opposite direction; and the limiting member passes through the annular member at the bottom of the testing block box from outside to inside and is threadedly connected to the inner hole of the annular member; the testing block box assembly further includes a spacer sheet lined between the testing block and the testing block box.

In some embodiments, the limiting member includes a placeholder member and a stop member, and the limiting member includes a disassembling member or the limiting member includes the placeholder member, the stop member, and the disassembling member.

In some embodiments, the placeholder member passes through the annular member at the bottom of the testing block box from outside to inside and is threadedly connected to the inner hole of the annular member; the stop member is removably attached to a portion of the placeholder member outside the box, and the stop member is configured to prevent the placeholder member from screwing into the box.

Another solution of the above improved device for debris flow abrasion testing for a box bottom operation hole and placeholder member is that the disassembling member passes through the annular member at the bottom of the testing block box from outside to inside and is threadedly connected to the inner hole of the annular member; and a length of the disassembling member screwed into the testing block box is greater than a length of the placeholder member screwed into the testing block box.

Utilizing the improved device for debris flow abrasion testing described above in the present disclosure, the present disclosure also provides a method for debris flow abrasion testing, with the following technical solution.

A method for debris flow abrasion testing utilizing the device for debris flow abrasion testing and implemented by a processor, including:

performing a testing block preparation operation including: designing a testing block feature parameter based on an abrasion testing experiment, prefabricating a concrete testing block conforming to a testing block box specification, performing a standard maintenance on the concrete testing block to a design age; and obtaining a raw parameter of the testing block by measuring and recording;

performing a testing block loading operation including: obtaining a testing block box, mounting a placeholder member and controlling the placeholder member to screw into the testing block box until a front end of the testing block box flushes with a bottom surface of the testing block box, limiting the placeholder member and preventing the placeholder member from continuing to be screwed in, wherein a bottom surface of an inside of the testing block box is laid with a spacer sheet; placing the testing block into the testing block box, and laying the spacer sheet between the testing block and the inside of the testing block box; mounting a fixing member by screwing in from two sides into the testing block to fix the testing block; and mounting the testing block box on a test component of the device;

performing an abrasion material sample preparation and loading operation including: designing a physical feature parameter of a designed debris flow abrasion material based on the abrasion testing experiment, preparing a debris flow abrasion material, and loading the debris flow abrasion material into a disc device;

performing an abrasion operation including: designing a designed debris flow motion feature parameter according to the abrasion testing experiment, adjusting a motor operation parameter, starting the motor, when a designed abrasion time t for the abrasion testing experiment is reached, shutting down the motor;

performing a testing block recycling operation including: controlling a self-testing component to disassemble the testing block box, withdrawing the fixing member, taking out the spacer sheets around the testing block, removing the limit of the placeholder member, and continuing to screw the placeholder member into the testing block box until the testing block is lifted, or replacing the placeholder member with a disassembling member, and rotating the placeholder member into the testing block box until the testing block is lifted, taking out the testing block, and recycling according to standard operations;

performing an abrasion data collection operation including: obtaining a post-abrasion parameter of the testing block by measuring and recording; and performing a debris flow abrasion feature analysis including: analyzing and evaluating a debris flow abrasion feature based on a testing block original parameter, the post-abrasion parameter, the designed debris flow physical feature parameter, and the designed debris flow motion feature parameter.

When performing the abrasion material sample preparation and loading operation, raw materials for preparing the debris flow abrasion material include abrasion particles, a soil, and water, and amounts of the three types of raw materials are calculated according to equations 1-5, i.e., a raw material water mass Mw(kg), a raw material soil mass Ms(kg), a raw material abrasion particle mass Mp(kg).

$$C_v = \frac{\rho_0 - \rho_w}{\rho_s - \rho_w} \tag{1}$$

$$M_{sd} = V_0 \times C_v \times \rho_s \tag{2}$$

$$M_w = V_0 \times (1 - C_v) \times \rho_w \tag{3}$$

-continued $$M_s = M_w \times \frac{s}{w} \tag{4}$$

$$M_p = M_{sd} - M_s \tag{5}$$

where the physical feature parameters of the designed debris flow abrasion material that belongs to a abrasion testing experimental feature are: a volume content of solid particles in the debris flow abrasion material $C_v$ (%), a debris flow abrasion material density in $\rho_0$ (kg/m$^3$), a raw material water density $\rho_w$ (kg/m$^3$), a solid particle density $\rho_s$ (kg/m$^3$), volume of the debris flow abrasion material $V_0$ (m$^3$), ratio of soil to water in the debris flow abrasion material $$\frac{s}{w}(\%);$$

s denotes a mass of the soil in the debris flow, w denotes a mass of the water in the debris flow, a mass of solid particles in the debris flow abrasion material $M_{sd}$ denotes a calculation intermediate amount.

In the abrasion operation of the above method for debris flow abrasion testing, the motor operation parameter to be designed mainly includes a motor inverter frequency f (Hz), which is designed according to equations 6-8.

$$n = \frac{f}{p \times (1 - s)} \tag{6}$$

$$s = \frac{N - n}{N} \tag{7}$$

$$u = 2 \times \pi \times n \times r \tag{8}$$

where the motion feature parameter of the designed debris flow abrasion material that belongs to a abrasion testing experimental feature is abrasion speed of a debris flow abrasion material u (m/s); the motion feature parameters of the designed debris flow abrasion material that belongs to the device operation parameter are a motor synchronous speed N (rps), a motor speed n (rps), a count of motor pole pairs p, a motor slip rate s, and a rotation radius of the disc device r (m).

The present disclosure provides the device and method for debris flow abrasion testing, to solve a problem of evaluation of the degree of abrasion and damage of various concrete engineering structures by the debris flow during the operation of actual debris flow prevention and control engineering. The present disclosure also provides a method for abrasion quantity evaluation of debris flow prevention and control engineering with the following technical solutions.

The method for abrasion quantity evaluation of debris flow prevention and control engineering utilizes the method for debris flow abrasion testing and implemented by a processor, including:

obtaining field site data related to debris flow prevention and control engineering based on a field site investigation;

constructing a debris flow abrasion testing experiment and determining indoor testing data, the indoor testing data including an abrasion testing experiment design parameter, a device operation parameter, and abrasion testing measurement data;

evaluating an abrasion quantity E of the debris flow prevention and control engineering based on the field site data and the indoor testing data according to an equation (9):

$$E = k \times \left(\frac{V_s}{C_v}\right) \times \left(\frac{\rho}{\rho_0}\right) \times \left(\frac{D_s}{D_0}\right)^2 \times \left(\frac{u_s}{u}\right)^2 \times A \times t \tag{9}$$

where E denotes the abrasion quantity of the debris flow prevention and control engineering in kg, k denotes an abrasion factor obtained by indoor testing in kg·h$^{-1}$·m$^{-2}$, which is determined based on the debris flow abrasion testing data, $V_S$ denotes a volume content of solid particles in debris flow on site in percentage, which is the field site data, $\rho$ denotes a density of the debris flow on site in kg/m$^3$, which is the field site data, $D_s$ denotes an average particle size of the solid particles of the debris flow on site in m, which is determined based on the field site data, $u_s$ denotes an on-site debris flow speed in m/s, which is determined based on the field site data, $C_v$ denotes a volume content of solid particles in the debris flow abrasion material in percentage, which is determined based on the debris flow abrasion testing data, $\rho_0$ denotes a debris flow abrasion material density in kg/m$^3$, which is determined based on the debris flow abrasion testing data, $D_0$ denotes an average particle size of solid particles in the debris flow abrasion material in m, which is determined based on the debris flow abrasion testing data, u denotes an abrasion speed of a debris flow abrasion material in m/s, which is determined based on the debris flow abrasion testing data, A denotes an abrasion area of an engineering structure in m$^2$, which is determined based on the field site data, and t denotes a duration of the abrasion in h, which is determined based on the field site data.

The above method for abrasion quantity evaluation of debris flow prevention and control engineering, the abrasion factor k obtained by indoor testing indicates an abrasion mass loss per unit area per unit time, and based on the debris flow abrasion testing data obtained by the method for debris flow abrasion testing of the present disclosure, the abrasion factor k obtained by indoor testing may be expressed in accordance with equation 10, where, $A_r$ denotes an abrasion rate obtained by indoor testing in kg/h, which is determined based on the indoor testing data, and $A_0$ denotes a testing block abrasion surface area in m$^2$, which is determined based on the indoor testing data.

$$k = \frac{A_r}{A_0} \tag{10}$$

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

Figure 1:
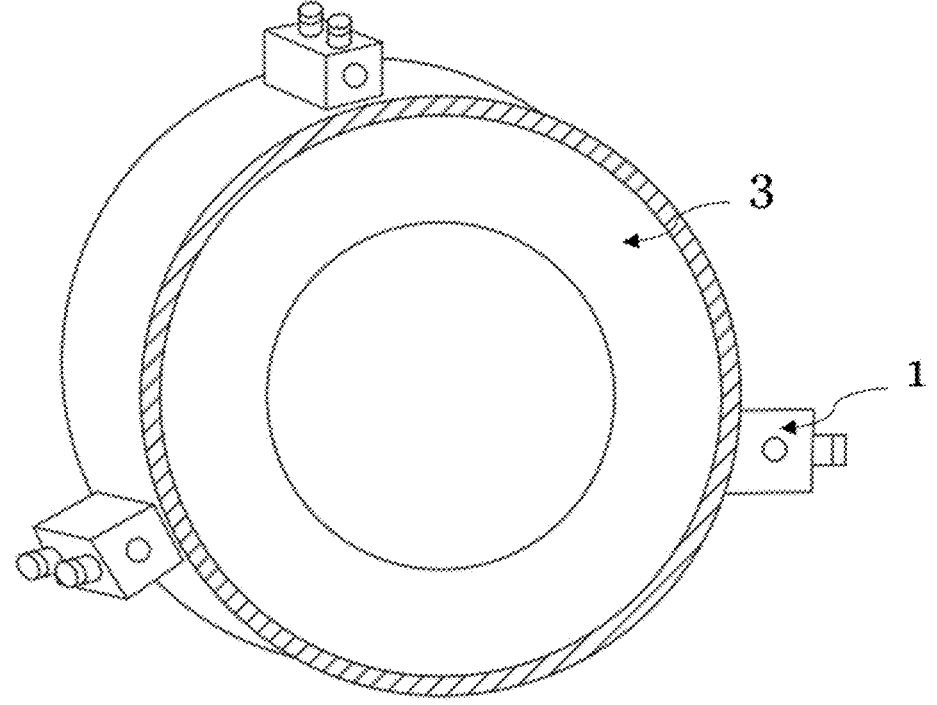
FIG. 1 is a schematic diagram illustrating a mounting manner of a testing block box on a disc device according to some embodiments of the present disclosure.

Numerical labels in the accompanying drawings are: 1, testing block box assembly; 11, testing block box; 111, hole; 112, annular member; 12, fixing member; 13, placeholder member; 14, stop member; 15, disassembling member; 16, spacer sheet; 2, testing block; 3, disc device.

DETAILED DESCRIPTION

The more clearly illustrate the technical solutions of the embodiments of the present disclosure, the accompanying drawings required to be used in the description of the embodiments are briefly described below. Obviously, the accompanying drawings in the following description are only some examples or embodiments thereof, and it is possible for those skilled in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," and/or "module" as used herein is a way to distinguish between different components, elements, parts, sections or assemblies at different levels. However, the words may be replaced by other expressions if other words accomplish the same purpose.

As shown in the present disclosure and in the claims, unless the context clearly suggests an exception, the words "a," "one," "an" and/or "the" do not refer specifically to the singular and may include the plural. In general, the terms "including" and "comprising" only suggest the inclusion of explicitly identified steps and elements that do not constitute an exclusive list, and the method or apparatus may also include other steps or elements.

Flowcharts are used in the present disclosure to illustrate operations performed by a system according to embodiments of the present disclosure. It should be appreciated that the preceding or following steps are not necessarily performed in an exact sequence. Instead, steps can be processed in reverse order or simultaneously. Also, it is possible to add other steps to these processes or remove a step or steps from them.

Preferred embodiments of the present disclosure are further described below in connection with the accompanying drawings.

Embodiment 1

Figure 2A:
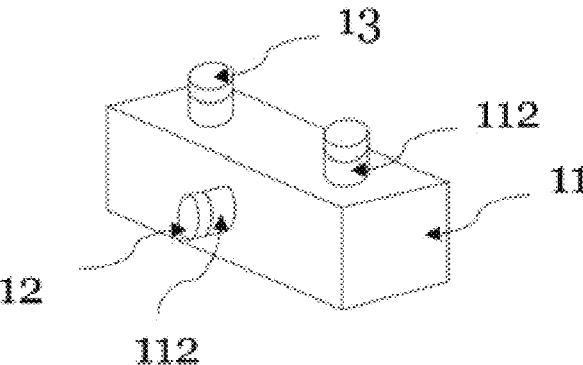
FIG. 2A is a schematic diagram illustrating an external structure of a testing block box assembly according to some embodiments of the present disclosure.
Figure 2B:
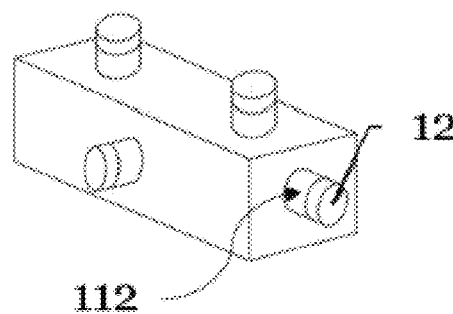
FIG. 2B is a schematic diagram illustrating another external structure of a testing block box assembly according to some embodiments of the present disclosure.
Figure 3:
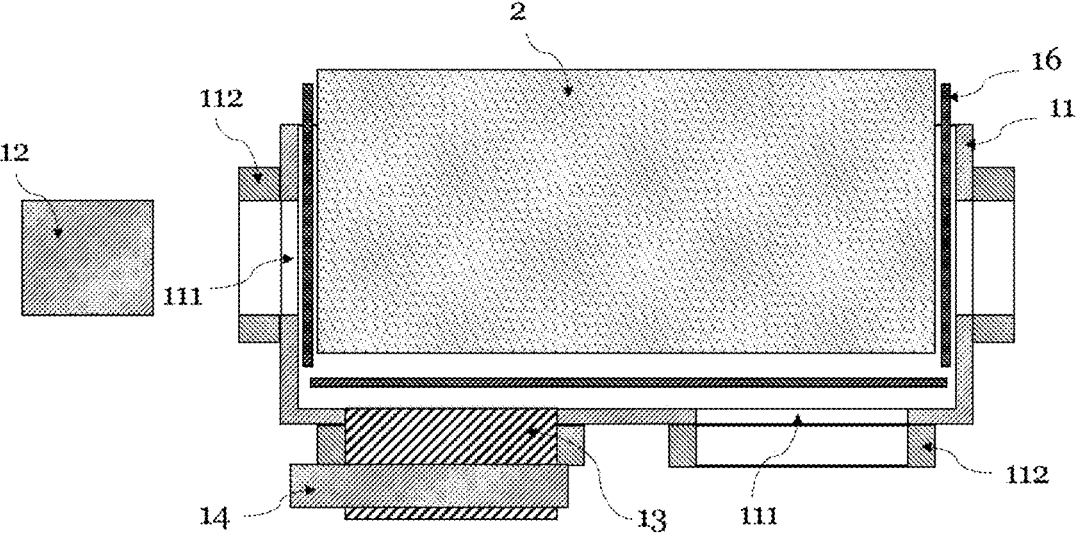
FIG. 3 is a schematic diagram illustrating a cross-sectional structure of a testing block box assembly according to some embodiments of the present disclosure.

A device for debris flow abrasion testing processed as shown in FIGS. 1-3.

The device for debris flow abrasion testing is an improved product of existing double-axis rolling wear resistance testing device and method capable of simulating channel cross-sectional morphology (ZL2021109404941), and the same structure as the original device is not repeated here. The specific implementation focuses on describing the improvements.

FIG. 1 is a schematic diagram illustrating a mounting manner of a testing block box on a disc device according to some embodiments of the present disclosure; FIG. 2A is a schematic diagram illustrating an external structure of a testing block box assembly 1 according to some embodiments of the present disclosure; FIG. 2B is a schematic diagram illustrating another external structure of a testing block box assembly 2 according to some embodiments of the present disclosure; FIG. 3 is a schematic diagram illustrating a cross-sectional structure of a testing block box assembly 1 according to some embodiments of the present disclosure.

A device for debris flow abrasion testing including a motor support base, a dual-axis motor, a disc device, and a testing block box assembly 1. A main body of the testing block box assembly 1 is a testing block box 11, the testing block box 11 is an open box, a hole 111 is provided in a bottom of the testing block box 11, an outer side of the hole 111 is fixed with an annular member 112, an inner hole of the annular member 112 is provided with inner threads and the hole is centered with the inner hole of the annular member 112. The testing block box assembly 1 further includes a fixing member 12 and a limiting member. Symmetrical holes 111 are provided on opposite sidewalls of the testing block box, an outer side of each of the symmetrical holes 111 is fixed with an annular member 112, an inner hole 111 of the annular member 112 is provided with inner threads and is centered with the inner hole of the annular member. The fixing member 12 passes through the annular member 112 on the sidewall of the testing block box 11 from outside to inside and is threadedly connected to the inner hole of the annular member to fix a testing block 2 in the testing block box 11 in an opposite direction. The limiting member passes through the annular member 113 at the bottom of the testing block box 11 from outside to inside and is threadedly connected to the inner hole of the annular member. The testing block box assembly 1 further includes a spacer sheet 16 lined between the testing block 2 and the testing block box 11.

The spacer sheet refers to a device used to block a heat transfer.

In this embodiment, the spacer sheet 16 is made of a rubber material.

The testing block box 11 refers to a measuring tool for carrying concrete testing blocks. The testing block box 11 may be used to measure a strength and a quality of the concrete.

The testing block is a block used for experiments. The testing block may be used to test the strength of the concrete.

The annular member refers to a part with an annular shape. For example, the annular member includes nuts or the like.

The fixing member refers to a part for fixing the testing block in the testing block box. For example, the fixing member includes a bolt or the like.

In some embodiments, the limiting member is composed of a placeholder 13 and a stop member 14; the limiting member is composed of a disassembling member 15; or the limiting member is composed of the placeholder 13, the stop member 14, and the disassembling member 15.

The placeholder member refers to a component capable of passing through the annular member of the bottom of the testing block box from outside to inside and threading into the inner hole of the annular member. For example, the placeholder member includes a bolt or the like.

In some embodiments, the placeholder member passes through the annular member at the bottom of the testing block box from outside to inside and is threaded to the inner hole of the annular member; and the stop member is removably connected to a portion of the placeholder member outside the box, and the stop member is configured to prevent the placeholder member from screwing into the box.

In some embodiments, the disassembling member passes through the annular member at the bottom of the testing block box from outside to inside and is threaded to the inner hole of the annular member, and a length of the disassembling member screwed into the testing block box is greater than a length of the placeholder member screwed into the testing block box.

The improved device for debris flow abrasion testing described above redesigns the testing block box assembly (i.e., the testing block box 24 in the original device) based on an original design. The original design fails to consider mounting and removal of the concrete testing block in the abrasion testing, resulting in two steps extremely cumbersome in the experimental testing: on the one hand, when preparing the testing block, circular steel nails need to be pre-buried in the testing block at specific positions, and it may be ensured that the two steel nails are horizontal and centered, otherwise the fastening forces at two ends of the testing block are imbalance when the testing block is mounted into the testing block box, resulting in an uneven bearing surface, and a poor abrasion contact. Therefore, a specialized mold for preparing the test block is required. On the other hand, when recycling the testing block after the abrasion ends, the testing block may be difficult to remove as fine solid particles are jammed in crevices of the box, and the removal may only be done by pulling the test testing block out by force. To address the above defects of the original device, the present disclosure redesigns the testing block box assembly by: for the former defect, the device of the present disclosure analyzes a direction and a magnitude of a force applied to the testing block during the abrasion process, and changes the force for fixing the testing block from a threaded connection tension in the original solution to a pressure. Thereby the testing block does not need to be pre-buried with thread brace rods, thus simplifying a structure of the testing block and the preparation process thereof. For the latter defect, the device of the present disclosure is designed with an operation hole at the bottom of the box, and then sealed with the placeholder member to keep the bottom of the box flat. When recovering and removing the testing block, the screw screws in from the operation hole to the box, and it is easier to push the testing block out of the testing block box by using a tiny spiral propulsion.

Some embodiments of the present disclosure provide an improved device for debris flow abrasion resistance testing with an optimized testing block box assembly structure. The product solves the problem of difficulty in mounting and recycling the testing block caused by small particles of debris flow abrasion material being embedded in the gap between the testing block and the device in the course of the abrasion testing, and simplifies a series of operational actions about the testing block, such as the preparation, the loading, and the recycling. Meanwhile, these operations are fully modeled and streamlined, which increases the efficiency of abrasion testing and enables the device to better satisfy the needs for debris flow abrasion testing.

Embodiment 2

When a testing block 2 is loaded during testing, the testing block 2 is fixed in place by a fixing member 12 on a side of a testing block box assembly and a placeholder member 13 (e.g., a short screw) on a bottom of the testing block box assembly.

When the testing is completed, the testing block 2 is difficult to be taken out if the bottom of the testing block box assembly is occupied by the placeholder member 13. At this time, at least one of the two placeholder members 13 at the bottom of the testing block box assembly may be taken out and replaced with a disassembling member 15 (e.g., a long screw), and by moving the disassembling member 15 upwardly from the bottom of the testing block box assembly, the testing block 2 may be quickly lifted out of the testing block box 11.

Figure 4:
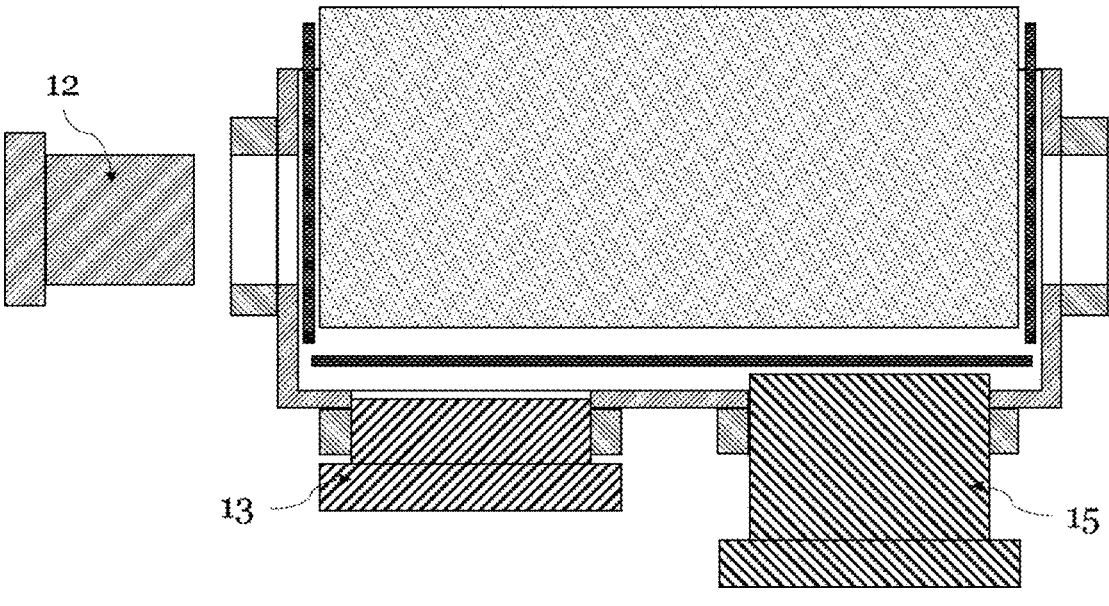
FIG. 4 is a schematic diagram illustrating a cross-sectional structure of a testing block box assembly of Embodiment 2.

FIG. 4 shows a processed device for debris flow abrasion testing. The same points as in the Embodiment 1 are not repeated.

FIG. 4 is a schematic diagram illustrating a cross-sectional structure of the testing block box assembly 1 of Embodiment 2. FIG. 4 shows an intermediate state of the mounting of the disassembling member 15.

The testing block box assembly 1 is arranged without the stop member 14, and the limiting member includes a separate disassembling member 15. The disassembling member 15 is configured to replace the placeholder member 13 to be threadedly connected to the testing block box 11, and the disassembling member 15 is capable of being screwed into the testing block box 11 for a longer distance than the placeholder member 13. In some embodiments, the disassembling member includes a bolt or the like.

In some embodiments, two placeholder members 13 at the bottom of the testing block box assembly are removed and replaced with the disassembling members 15, which can lift out the testing block 2.

In some embodiments, it is also possible to remove only one placeholder 13 at a time at the bottom of the testing block box assembly, replace the placeholder 13 with one disassembling member 15, and lift the testing block 2 out by the disassembling member one by one. Both placeholder members 13 are removed at the bottom of the testing block box assembly while replacing them with the disassembling member 15 better protects the testing block 2.

In this design, the placeholder 13 only has a function of "placeholding" to ensure that the bottom surface of the box is flat. When removing the testing block 2, the placeholder member 13 is first withdrawn from an operation hole (i.e., the hole 111), and then the disassembling member 15 is mounted. The disassembling member 15 spirally advances into the box to lift the testing block. This solution shortens a length of the placeholder member 13 and simplifies the matching structure design of the stop member 14 and the placeholder member 13.

In this embodiment, as the matching structure of the stop member 14 and the placeholder member 13 is omitted, a great count of existing parts are processed and molded. For example, the annular member 112 uses a common nut, and the fixing member 12, the placeholder member 13, and the disassembling member 15 all use common bolts. As a result, the testing block box assembly 1 that satisfies requirements of the test design (mainly specifications of the operation hole, and a specification of the fixing member 12, etc.) may be processed quickly and at a very low cost with a wide range of available nuts and bolts specifications.

In some embodiments, a screw length L13 of a bolt of the placeholder 13 is equal to a thickness of a nut of the placeholder member at a mounting position, and a screw length L14 of the bolt of the disassembling member 15 is greater than a thickness of a nut of the placeholder member at the mounting position. In this embodiment, the screw length L14 of the bolt of the disassembling member 15 is equal to a sum of the thickness of the nut of the placeholder member at the mounting position and a thickness of the testing block 2. The mounting position of the placeholder member refers to a position for the mounting of the placeholder member.

Embodiment 3

In some embodiments, a method for debris flow abrasion testing performed by a processor using a device for debris flow abrasion testing in a technical solution of the present disclosure includes operations 110-130 as follows.

In some embodiments, the processor is configured to manage resources and process data and/or information from at least one component of the device for debris flow abrasion testing (e.g., the testing block box 11, etc.) or from an external data source (e.g., a cloud data center). For example, the processor is configured to perform the method for debris flow abrasion testing or a method for abrasion quantity evaluation of debris flow prevention and control engineering. More descriptions of the method for debris flow abrasion testing or the method for abrasion quantity evaluation of debris flow prevention and control engineering may be found in the following related descriptions. The processor includes a central processing unit (CPU), an application-specific integrated circuit (ASIC), an application-specific instruction processor (ASIP), a graphics processing unit (GPU), a microprocessor, or any combination thereof. In some embodiments, the processor is located on the cloud or on a terminal. The terminal may include a computer, a tablet, a cell phone, or the like.

In 110, field site data related to debris flow prevention and control engineering (as shown in table 1) is obtained based on a field site investigation.

The field site investigation is an on-site investigation of the debris flow prevention and control engineering. The field site investigation referred to in this embodiment includes a variety of geological surveys, reconnaissance, mappings, and surveying works for a site of mountain flood debris flow channel where the engineering is located, current simulation experiments, testing experiments, observation experiments, analytical experiments, historical disaster record obtaining and relevant technical specifications in the field, as well as empirical methodologies and data obtaining. The data obtained by the field site investigation is collectively referred to as the field site data of the embodiment.

For example, the debris flow is sampled on-site, and then a certain volume of a total volume of the on-site debris flow as well as a volume of solid particles are obtained through a test experiment, and then the processor determines a ratio of the volume of the solid particles to the total volume of the on-site debris flow as a volume content of solid particles in debris flow on site.

TABLE 1

| on-site data for debris flow prevention and control engineering | |
|---|---|
| indicator type | indicator |
| Physical features of the debris flow | volume content of solid particles in debris flow on site $V_s$ |
| | density of the debris flow on site $\rho$ |
| | average particle size of the solid particles of the debris flow on site $D_s$ |
| Motion feature of the debris flow | on-site debris flow speed $u_s$ |
| abrasion feature of engineering structures | abrasion area of an engineering structure A |

The volume content of solid particles in debris flow on site refers to a volume proportion of the solid particles in a certain volume of on-site debris flow.

The density of the debris flow on site refers to a ratio of a mass to a volume of the debris flow fluid on site.

The average particle size of the solid particles of the debris flow on site refers to an average of diameters of the solid particles of the on-site debris flow.

The on-site debris flow speed refers to a motion speed of the on-site debris flow per unit time.

The abrasion area of the engineering structure refers to an area of a surface of the engineering structure that is lost due to an abrasion action of the debris flow. The engineering structure refers to a variety of load-bearing components made of concrete materials. For example, the engineering structure includes the concrete or the like.

In some embodiments, the processor determines the volume content of solid particles in debris flow on site, the density of the debris flow on site, the average particle size of the solid particles of the debris flow on site, and the on-site debris flow speed based on field site data obtained from the field site investigation.

In 120, a debris flow abrasion testing experiment is constructed and indoor testing data is determined, i.e., debris flow abrasion testing experimental data is obtained.

In some embodiments, the indoor testing data includes an abrasion testing experiment design parameter, a device operation parameter, and abrasion testing measurement data.

The abrasion testing experiment design parameter may include an abrasion speed of a debris flow abrasion material u, a ratio of soil to water in the debris flow abrasion material, a debris flow abrasion material volume $V_0$, a solid particle density $\rho_s$, a raw material water density $\rho_w$, and a debris flow abrasion material density $\rho_0$. The device operation parameter may include a motor synchronous speed N, a motor inverter frequency f, a count of motor pole pairs p, a motor slip rate s, and a rotation radius of the disc device r, or the like. The abrasion testing measurement data may include a compressive strength, a flexural strength, and a splitting tensile strength, or the like.

TABLE 2

| Indicator type | Indicator | Indicator type | Indicator |
|---|---|---|---|
| designed testing block material feature | compressive strength; flexural strength; splitting tensile strength | raw material feature of debris flow abrasion material | raw material water density $\rho_w$; solid particle density $\rho_s$ |
| designed physical feature of abrasion materials for designing debris flows | debris flow abrasion material density $\rho_0$ in experiment; average particle size of solid particles in the debris flow abrasion material $D_0$ in experiment; volume content of solid particles in the debris flow abrasion material $C_v$ in experiment; ratio of soil to water in the debris flow abrasion material $\frac{s}{w}$ | Device operation parameters | motor synchronous speed N; motor inverter frequency f; count of motor pole pairs p; motor slip rate s; rotation radius of the disc device r |
| designed motion feature of abrasion materials for designing debris flows | abrasion speed of a debris flow abrasion material u; duration of abrasion t | | |

The debris flow abrasion material density in the experiment refers to a density of the debris flow abrasion material used in the experiment.

The average particle size of solid particles in the debris flow abrasion material in the experiment refers to an average of the diameters of the solid particles in the debris flow abrasion material used in the experiment.

The volume content of solid particles in the debris flow abrasion material refers to a volume ratio of solid particles in a certain volume of debris flow particle stone used in the experiment.

The abrasion speed of a debris flow abrasion material refers to a damage speed of the debris flow abrasion materials on a surface of the test block in the experiment.

obtains a raw parameter of the testing block by measuring and recording. The raw parameter may include a saturated density of the testing block ($\rho_{sat}$). The saturated density of the testing block refers to a mass per unit of the volume of the testing block when pores of the testing block are all filled with water.

Merely by way of example, the device for debris flow abrasion testing of Embodiment 2 is used in this implementation to obtain the debris flow abrasion testing experimental data.

Specifications for the testing block box assembly 1 and the testing block 2 are shown in Table 3.

TABLE 3

| Specification parameters (mm) for testing block box assembly and concrete testing block | | | | | | |
|---|---|---|---|---|---|---|
| inner cavity of the testing block box | spacer sheet | testing block | placeholder bolt | fixing member bolt | disassembling bolt | annular member nut |
| length: 162 width: 42 | thickness: 2 | length: 160 width: 40 height: 40 | diameter: 25 length: 30 | diameter: 25 length: 31 | diameter: 25 length: 70 | diameter: 25 length: 30 |

The duration of the abrasion refers to a duration of erosion of the testing block surface by the debris flow abrasion material in the experiment.

In some embodiments, the processor performs a method for debris flow abrasion testing with operations 121-127 below to obtain the debris flow abrasion testing experimental data.

In 121, a testing block preparation operation is performed.

In some embodiments, the processor designs a testing block feature parameter based on an abrasion testing experiment, prefabricates a concrete testing block conforming to a testing block box specification, performs a standard maintenance on the concrete testing block to a design age; and By designing a testing block feature parameter (Table 2) based on an abrasion testing experiment, the concrete testing block 2 is processed, and after forming, the testing block feature satisfies the compressive strength of 48.0±2.9 (MPa), the flexural strength of 10.84±0.38 (MPa), the splitting tensile strength of (6.75±1.01 MPa). a testing block abrasion surface area of the testing block 2, $A_0 = 0.16*0.04*0.04 = 2.56*10{-}4 \ m^2$.

The testing block 2 is maintained by a standard maintenance to a design age. the raw parameter of the testing block 2 is measured and recorded (Table 5). The design age refers to an age at which a strength of the concrete is evaluated, e.g., 28 days, etc.

After maintained to reach the design age, the testing block 2 is immersed in water for at least 48 h until a quality of the testing block is stabilized; the testing block is taken out from the water, a surface of the testing block is dried, and a mass (Mb) is recorded using a balance with an accuracy of 0.01 g. An outline specification (a length Ls, a width $W_s$, a height $H_s$) of the testing block is measured using a micrometer with an accuracy of 0.001 mm. The processor may use a saturated density equation to calculate the saturated density ($\rho_{sat}$) of the testing block. In some embodiments, the processor divides the mass of the testing block 2 by the volume of the testing block 2 to obtain the saturation density.

In 122, a testing block loading operation is performed.

In some embodiments, the processor obtains the testing block box 11, mounts the placeholder member 13, controls the placeholder member 13 to screw into the testing block box until a front end of the placeholder member 13 flushes with a bottom surface of the testing block box 11, limits the placeholder member and prevents the placeholder member from continuing to be screwed in. A bottom surface of an inside of the testing block box 11 is laid with the spacer sheet 16; the testing block 2 is placed into the testing block box, and the spacer sheet 16 is laid between the testing block 2 and the inside of the testing block box 11. The fixing member 12 is mounted and the bolt of the fixing member 12 is fasten. The screws are screwed in from two opposite sides toward the same direction to fix the fixing member 12, and the testing block box 11 is installed on a test component of the device.

In 123, an abrasion material sample preparation and loading operation is performed.

In some embodiments, the processor designs a physical feature of a designed debris flow based on the abrasion testing experiment, prepares a debris flow abrasion material, and loads the debris flow abrasion material into a disc device. The disc device refers to a device that combines an electrode theory with fluid dynamics. The disk device may be driven by a motor to drive the testing block box assembly as well as the debris flow abrasion material to rotate.

Parameters of the physical feature of a designed debris flow include a designed testing block feature, a physical feature of the design debris flow abrasion material, a motion parameters of each group of abrasion materials were calculated in accordance with equations 1-5 in Table 4.

$$C_v = \frac{\rho_0 - \rho_w}{\rho_s - \rho_w} \tag{1}$$

$$M_{sd} = V_0 \times C_v \times \rho_s \tag{2}$$

$$M_w = V_0 \times (1 - C_v) \times \rho_w \tag{3}$$

$$M_s = M_w \times \frac{s}{w} \tag{4}$$

$$M_p = M_{sd} - M_s \tag{5}$$

where $C_v$ denotes a volume content of solid particles in the debris flow abrasion material in percentage, which is an abrasion testing experiment design parameter, $\rho_0$ denotes a debris flow abrasion material density in $kg/m^3$, which is an abrasion testing experiment design parameter, $\rho_w$ denotes a raw material water density in $kg/m^3$, which is a constant, $\rho_s$ denotes a solid particle density in $kg/m^3$, which is an abrasion testing experiment design parameter, $M_{sd}$ denotes a mass of solid particles in the debris flow abrasion material in kg, $V_0$ denotes a debris flow abrasion material volume in $m^3$, which is an abrasion testing experiment design parameter, $$\frac{s}{w}$$

denotes a ratio of soil to water in the debris flow abrasion material in percentage, s denotes a mass of the soil in the debris flow, and w denotes a mass of the water in the debris flow, which is an abrasion testing experiment design parameter, $M_w$ denotes a mass of raw material water in kg, $M_s$ denotes a mass of raw soil in kg, and $M_p$ denotes a mass of raw abrasion particles in kg.

The abrasion testing experiment design parameter is the parameter designed by those skilled in the art according to actual needs for the purpose of the abrasion testing experiment.

TABLE 4

| | | | | | | | | | | |
|---|---|---|---|---|---|---|---|---|---|---|
| Abrasion material ratio design parameters | | | | | | | | | | |
| serial number / | Type of abrasion particles / | $C_v$ % | $\rho_0$ $kg/m^3$ | $\rho_w$ $kg/m^3$ | $\rho_s$ $kg/m^3$ | S/W % | $M_{sd}$ kg | $M_s$ kg | $M_w$ kg | $M_p$ kg |
| 1 | limestone | 30.3 | 1500 | 1000 | 2650 | 0.46 | 1.93 | 1.28 | 2.79 | 1.93 |
| 2 | steel ball | 30.3 | 1500 | 1000 | 2650 | 0.46 | 1.93 | 1.28 | 2.79 | 1.93 |
| 3 | steel ball | 30.3 | 1500 | 1000 | 2650 | 0.46 | 1.93 | 1.28 | 2.79 | 1.93 |
| 4 | steel ball | 30.3 | 1500 | 1000 | 2650 | 0.46 | 1.93 | 1.28 | 2.79 | 1.93 |
| 5 | steel ball | 30.3 | 1500 | 1000 | 2650 | 0.46 | 1.93 | 1.28 | 2.79 | 1.93 |
| 6 | steel ball | 30.3 | 1500 | 1000 | 2650 | 0.46 | 1.93 | 1.28 | 2.79 | 1.93 |
| 7 | steel ball | 18.2 | 1300 | 1000 | 2650 | 0.50 | 0.30 | 1.64 | 3.27 | 0.30 |
| 8 | steel ball | 30.3 | 1500 | 1000 | 2650 | 0.50 | 1.82 | 1.40 | 2.79 | 1.82 |
| 9 | steel ball | 42.4 | 1700 | 1000 | 2650 | 1.00 | 2.19 | 2.30 | 2.30 | 2.19 |
| 10 | steel ball | 54.5 | 1900 | 1000 | 2650 | 1.00 | 3.96 | 1.82 | 1.82 | 3.96 | feature of the designed debris flow abrasion material, as well as a raw material for the preparation of the debris flow abrasion material.

In some embodiments, the raw material used by the processor to formulate the debris flow abrasion material includes abrasion particles, soil, and water (e.g., as shown in Table 2). A total of 10 groups of tests were designed, and In 124, an abrasion operation is performed.

In some embodiments, the processor designs a designed debris flow motion feature parameter according to the abrasion testing experiment, adjusts a motor operation parameter, starts the motor, when a designed abrasion time t for the abrasion testing experiment is reached, shuts down the motor. The designed abrasion time t may be preset for those skilled in the art based on experience.

For each set of testing, the formulated debris flow abrasion material was loaded into the disc device. According to the designed debris flow motion feature parameter of the abrasion testing experiment, the motor inverter frequency f of each set of testing was calculated according to equations 6-8, and the motor operation parameter was adjusted. Then the motor was started, and when the designed abrasion time t for the abrasion testing experiment is reached, the motor was shut down. During the abrasion process the device for debris flow abrasion testing or a testing component of the device for debris flow abrasion testing was wrapped with sound-absorbing materials.

$$n = \frac{f}{p \times (1-s)} \tag{6}$$

$$s = \frac{N-n}{N} \tag{7}$$

$$u = 2 \times \pi \times n \times r \tag{8}$$

where f denotes the motor inverter frequency in Hz, N denotes the motor synchronous speed in rps which is a device operation parameter, n denotes a motor speed in rps, which is a device operation parameter, p denotes a count of motor pole pairs which is a device operation parameter, s denotes a motor slip rate, which is a device operation parameter, u denotes an abrasion speed of a debris flow abrasion material in m/s, which is an abrasion testing experiment design parameter, and r denotes a rotation radius of the disc device in m, which is a device operation parameter.

The device operation parameter refers to a parameter required for operation of the device for debris flow abrasion testing.

To save text space, the following steps only list some of the testing data in Table 4.

TABLE 5

| Parameters related to abrasion operation | | | | | | | |
|---|---|---|---|---|---|---|---|
| Serial No. | f(Hz) | p | s | R(m) | u(m/s) | n (rps) | t (h) |
| 1 | 1.9 | 2 | 0 | 0.5 | 3 | 0.96 | 24 |
| 3 | 2.5 | 2 | 0 | 0.5 | 4 | 1.27 | 24 |
| 4 | 3.2 | 2 | 0 | 0.5 | 5 | 1.59 | 24 |

In the present disclosure, different debris flow abrasion testing experiments are designed to compare the optimal abrasion testing parameters based on each set of experimental data. A result shows that a debris flow abrasion testing condition for obtaining the optimal abrasion effect is: debris flow abrasion material density $\rho_0 = 1900$ kg/m³; the abrasion speed of a debris flow abrasion material u=5 m/s, and the raw abrasion particles adopt the steel balls with a particle size of 20 mm.

In 125, a testing block recycling operation is performed.

At the end of the test, the processor may drive a mechanical arm through the motor to control a self-testing component to disassemble the testing block box 11, withdraw the fixing member 12, take out the spacer sheets 16 around the testing block 2, remove the limit of the placeholder member 13, and continue to screw the placeholder member 13 into the testing block box 11 until the testing block 2 is lifted, or replace the placeholder member 13 with the disassembling member 15, and rotate the placeholder member 13 into the testing block box 11 until the testing block 2 is lifted, take out the testing block 2, and recycle according to standard operations.

In 126, an abrasion data collection operation is performed.

In some embodiments, the processor obtains the measured and recorded post-abrasion parameter of the testing block 2 from a known database or memory. The known database or memory is stored with a post-abrasion parameter of the testing block 2.

The post-abrasion parameter of the testing block 2 is measured and recorded (Table 5).

The simplest means of collecting data on a profile of the testing block 2 (especially an abrasion surface) is to use a 3D scanning modeling, which allows an accurate measurement of an abrasion surface morphology and related physical indicator changes by comparing the model before and after the testing.

In addition to the 3D modeling, it is difficult to use conventional manners to measure a height value of the testing block 2 after testing. To this end, the present disclosure provides a measurement manner to measure the change in height of the testing block 2 by conventional measurement means. Specifically, after the testing block is prepared, and the original indicator is measured, marking lines are drawn on the abrasion surface (e.g., using waterproof markers) in advance, such as marking seven straight lines at intervals of 20 mm, 40 mm, 60 mm, 80 mm, 100 mm, 120 mm 140 mm along a long axis of the testing block 2. After abrasion, critical abrasion sites are quickly located by marking positions of breakpoints on the line and diameters of the breakpoints. By measuring a height of critical abrasion site ($H_a$) and analyzing the change in height before and after abrasion, a depth of abrasion at a single point ($\Delta H$) is measured. In 127, a debris flow abrasion feature analysis is performed.

In some embodiments, the processor analyzes and evaluates the debris flow abrasion feature based on the original parameter, the post-abrasion parameter, the designed debris flow physical feature parameter, and the design debris flow motion feature parameter.

TABLE 6

| Indicator values before and after abrasion of the testing block | | | | |
|---|---|---|---|---|
| | mass | high | Drainage volume | saturated density |
| original parameter | $M_b$ | $H_s$ | $I$ | $\rho_{sat}$ |
| post-abrasion parameter | $M_a$ | $H_a$ | $V_{drain}$ | $I$ |

$\Delta m = M_b - M_a$  Abrasion mass loss, $A_r = \Delta m/t$  Testing abrasion rate, $\Delta H = H_s - H_a$  Single-point abrasion depth, Average abrasion depth, $$\Delta H_{av} = \frac{\Delta m}{(L_s \times W_s) \times \rho_{sat}}, \text{ or } \Delta H_{av} = \frac{V_{drain}}{L_s \times W_s}$$

Abrasion factor k obtained from indoor testing, according to an equation (10).

$$k = \frac{A_r}{A_0} \quad (10)$$

where k denotes the abrasion factor obtained from the indoor testing in kg·h$^{-1}$·m$^{-2}$, A$_r$ denotes an abrasion rate obtained by indoor testing in kg/h, which is determined based on the indoor testing data, and A$_0$ denotes a testing block abrasion surface area in m$^2$, which is determined based on the indoor testing data.

The descriptions of other abrasion feature analysis contents are omitted here to save space.

The above method for debris flow abrasion testing is to process the concrete testing block, prepare the debris flow abrasion material, and adjust device operation based on relevant design parameters of the abrasion testing experiment to perform a debris flow abrasion destructive force test. Before abrasion, the original parameters of the testing block, e.g., the physical specification, the mass, the volume, the 3D scanning modeling, a scanning electron microscope imaging of the abrasion surface, and a high-definition digital imaging of the abrasion surface, etc. of the testing block are measured and recorded. After experiment, indicators of the testing block after abrasion are measured and recorded. The indicators after abrasion generally include original parameter corresponding item, as well as parameter items that specifically characterize the abrasion damage of the debris flow.

In 130, evaluating an abrasion quantity E of the debris flow prevention and control engineering based on the field site data and the indoor testing data.

mined based on the indoor testing data, D$_0$ denotes an average particle size of solid particles in the debris flow abrasion material in m, which is determined based on the indoor testing data, u denotes an abrasion speed of a debris abrasion material in m/s, which is determined based on the indoor testing data, A denotes an abrasion area of an engineering structure in m$^2$, which is determined based on the field site data, and t denotes a duration of the abrasion in h, which is determined based on the field site data.

A basic principle of the above method for abrasion quantity evaluation of debris flow prevention and control engineering is to evaluate and select, from different debris flow physical feature parameters and motion feature parameters, the indicators that effectively measure an abrasion damage contribution rate as calculation variables, and to construct a mathematical calculation model to evaluate the abrasion quantity of the debris flow prevention and control engineering.

$$k = \frac{A_r}{A_0} \quad (10)$$

where k denotes the abrasion factor obtained by indoor testing in kg·h$^{-1}$·m$^{-2}$, A$_r$ denotes an abrasion rate obtained by indoor testing in kg/h, which is determined based on the indoor testing data, A$_0$ denotes a testing block abrasion surface area in m$^2$, which is determined based on the indoor testing data.

TABLE 7

| | | | Evaluation data on the degree of abrasion damage of debris flow prevention and control engineering | | | | | | |
|---|---|---|---|---|---|---|---|---|---|
| A$_r$ | A$_0$ | k | $\frac{V_s}{C_v}$ | $\frac{\rho}{\rho_0}$ | $\frac{D_s}{D_0}$ | $\frac{u_s}{u}$ | A | t | E |
| 4*10$^{-4}$ kg/h | 6.4*10$^{-3}$ m$^2$ | 0.0625 kg/h · m$^2$ | 1 | 1 | 30 | 1 | 10 m$^2$ | 24 h | 5625 kg |

The abrasion quantity E of the debris flow prevention and control engineering is calculated by using the field site data and the indoor test data of the debris flow prevention and control engineering according to equations 9 and 10 (Table 7).

$$E = k \times \left(\frac{V_s}{C_v}\right) \times \left(\frac{\rho}{\rho_0}\right) \times \left(\frac{D_s}{D_0}\right)^2 \times \left(\frac{u_s}{u}\right)^2 \times A \times t \quad (9)$$

where E denotes the abrasion quantity of the debris flow prevention and control engineering in kg, k denotes an abrasion factor obtained by indoor testing in kg·h$^{-1}$·m$^{-2}$, which is determined based on the indoor testing data, V$_s$ denotes a volume content of solid particles in debris flow on site in percentage, which is the field site data, $\rho$ denotes a density of the debris flow on site in kg/m$^3$, which is the field site data, D$_s$ denotes an average particle size of the solid particles of the debris flow on site in m, which is determined based on the field site data, u$_s$ denotes an on-site debris flow speed in m/s, which is determined based on the field site data, C$_v$ denotes a volume content of solid particles in the debris flow abrasion material in percentage, which is determined based on the indoor testing data, $\rho_0$ denotes a debris flow abrasion material density in kg/m$^3$, which is deter- In 140, performing verification.

Taking a local structure of the prevention and control engineering as an example, the data measured according to the method of the present disclosure is compared with the measured data, it shows that an accuracy of the abrasion measurement result in the present disclosure is within an acceptable range of an engineering practice.

The present disclosure establishes a prediction model of abrasion quantity of on-site structures constructed by connecting key parameters between two sets of data, namely, engineering site data (i.e., the field site data related to the debris flow prevention and control engineering) and laboratory data (i.e., the indoor testing data) by means of the method for debris flow abrasion testing, and solves the problem of conversion between an indoor abrasion testing data analysis to an on-site engineering abrasion features evaluation, and specifically provides a method for abrasion quantity evaluation of debris flow prevention and control engineering. Using the method of the present disclosure, the technical solution of evaluating the degree of abrasion damage of debris flow prevention and control engineering may be changed from the current combination of on-site measurements and empirical determinations to a combination of the on-site measurements and the indoor experimental means, which enhances a scientificity and reliability of the evaluation, and thus enhances a utilization value of the evaluation data, which is more effectively used as scientific indicators for the design and maintenance of debris flow prevention and control engineering.

The basic concepts have been described above, and it is apparent to those skilled in the art that the foregoing detailed disclosure is intended as an example only and does not constitute a limitation of the present disclosure. While not expressly stated herein, those skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure

What is claimed is:

1. A device for debris flow abrasion testing, including a motor support base, a dual-axis motor, a disc device, and a testing block box assembly; wherein a main body of the testing block box assembly is a testing block box, the testing block box is an open box, a hole is provided in a bottom of the testing block box, an outer side of the hole is fixed with an annular member, an inner hole of the annular member is provided with inner threads and is centered with the inner hole of the annular member; symmetrical holes are provided on opposite sidewalls of the testing block box, an outer side of each of the symmetrical holes is fixed with an annular member, an inner hole of the annular member is provided with inner threads and is centered with the inner hole of the annular member; and the testing block box assembly further includes a fixing member, a placeholder member, and a stop member;

the fixing member passes through the annular member on the sidewall of the testing block box from outside to inside and is threadedly connected to the inner hole of the annular member to fix a testing block in the testing block box in an opposite direction; and the placeholder member passes through the annular member at the bottom of the testing block box from outside to inside and is threadedly connected to the inner hole of the annular member; the stop member is removably attached to a portion of the placeholder member outside the box, and the stopper member is configured to prevent the placeholder member from screwing into the box; and the testing block box assembly further includes a spacer sheet lined between the testing block and the testing block box.

2. The device of claim 1, wherein the device further includes an independent placeholder member without the stop member, the disassembling member replacing the placeholder member passes through the annular member at the bottom of the testing block box from outside to inside and is threadedly connected to the inner hole of the annular member; and a length of the disassembling member screwed into the testing block box is greater than a length of the placeholder member screwed into the testing block box.

3. The device of claim 2, wherein the annular member is a nut, and the fixing member, the placeholder member, and the disassembling member are bolts.

4. The device of claim 3, wherein a screw length L13 of a bolt of the placeholder member is equal to a thickness of a nut of the annular member at a mounting position of the placeholder member, and a screw length L14 of a bolt of the disassembling member is equal to a sum of the thickness of the nut of the annular member at a mounting position of the placeholder member and a thickness of the testing block.

5. A method for debris flow abrasion testing, wherein the method utilizes the device for debris flow abrasion testing of claim 1, and is implemented by a processor, comprising:

performing a testing block preparation operation including: designing a testing block feature parameter based on an abrasion testing experiment, prefabricating a concrete testing block conforming to a testing block box specification, performing a standard maintenance on the concrete testing block to a design age; and obtaining a raw parameter of the testing block by measuring and recording;

performing a testing block loading operation including: obtaining a testing block box, mounting a placeholder member and controlling the placeholder member to screw into the testing block box until a front end of the testing block box flushes with a bottom surface of the testing block box, limiting the placeholder member and preventing the placeholder member from continuing to be screwed in, wherein a bottom surface of an inside of the testing block box is laid with a spacer sheet; placing the testing block into the testing block box, and laying the spacer sheet between the testing block and the inside of the testing block box; mounting a fixing member by screwing in from two sides into the testing block to fix the testing block; and mounting the testing block box on a test component of the device;

performing an abrasion material sample preparation and loading operation including: designing a physical feature of a designed debris flow based on the abrasion testing experiment, preparing a debris flow abrasion material, and loading the debris flow abrasion material into a disc device;

performing an abrasion operation including: designing a designed derris flow motion feature parameter according to the abrasion testing experiment, adjusting a motor operation parameter, starting the motor, when a designed abrasion time t for the abrasion testing experiment is reached, shutting down the motor;

performing a testing block recycling operation including: controlling a self-testing component to disassemble the testing block box, withdrawing the fixing member, taking out the spacer sheets around the testing block, removing the limit of the placeholder member, and continuing to screw the placeholder member into the testing block box until the testing block is lifted, or replacing the placeholder member with a disassembling member, and rotating the placeholder member into the testing block box until the testing block is lifted, taking out the testing block, and recycling according to standard operations;

performing an abrasion data collection operation including: obtaining a post-abrasion parameter of the testing block by measuring and recording; and performing a debris flow abrasion feature analysis including: analyzing and evaluating a debris flow abrasion feature based on a testing block original parameter, the post-abrasion parameter, the designed debris physical feature parameter, and the designed debris flow motion feature parameter.

6. The method of claim 5, wherein when performing the abrasion material sample preparation and loading operation, raw materials for preparing the debris flow abrasion material include abrasion particles, a soil, and water, and amounts of the three types of raw materials are calculated according to equations 1-5, $$C_v = \frac{\rho_0 - \rho_w}{\rho_s - \rho_w} \qquad (1)$$

$$M_{sd} = V_0 \times C_v \times \rho_s \qquad (2)$$

$$M_w = V_0 \times (1 - C_v) \times \rho_w \qquad (3)$$

$$M_s = M_w \times \frac{s}{w} \qquad (4)$$

$$M_p = M_{sd} - M_s \qquad (5)$$

where $C_v$ denotes a volume content of solid particles in the debris flow abrasion material in percentage, which is an abrasion testing experiment design parameter; $\rho_0$ denotes a debris flow abrasion material density in kg/m$^3$, which is an abrasion testing experiment design parameter; Pw denotes a raw material water density in kg/m$^3$, which is a constant; $\rho_s$ denotes a solid particle density in kg/m$^3$, which is an abrasion testing experiment design parameter, $M_{sd}$ denotes a mass of solid particles in the debris flow abrasion material in kg; $V_0$ denotes a debris flow abrasion material volume in m$_3$, which is an abrasion testing experiment design parameter;

$$\frac{s}{w}$$

denotes a ratio of soil to water in the debris flow abrasion material in percentage, s denotes a mass of the soil in the debris flow, w denotes a mass of the water in the debris flow, which is an abrasion testing experiment design parameter, $M_w$ denotes a mass of raw material water in kg, $M_s$ denotes a mass of raw soil in kg, and $M_p$ denotes a mass of raw material abrasion particles in kg.

7. The method of claim 5, wherein the motor operation parameter includes a motor inverter frequency f (Hz), which is designed according to equations 6-8 as follows:

$$n = \frac{f}{p \times (1 - s)} \qquad (6)$$

$$s = \frac{N - n}{N} \qquad (7)$$

$$u = 2 \times \pi \times n \times r \qquad (8)$$

where f denotes the motor inverter frequency in Hz, N denotes a motor synchronous speed in rps, n denotes a motor speed in rps, p denotes a count of motor pole pairs, s denotes a motor slip rate, u denotes an abrasion speed of a debris flow abrasion material in m/s, which is an abrasion testing experiment design parameter, and r denotes a rotation radius of the disc device in m.

8. A method for abrasion quantity evaluation of debris flow prevention and control engineering, wherein the method utilizes the method for debris flow abrasion testing of claim 7, and is implemented by a processor, comprising:

obtaining field site data related to debris flow prevention and control engineering based on a field site investigation;

constructing a debris flow abrasion testing experiment and determining indoor testing data, wherein the indoor testing data includes an abrasion testing experiment design parameter, a device operation parameter, and abrasion testing measurement data;

evaluating an abrasion quantity E of the debris flow prevention and control engineering based on the field site data and the indoor testing data according to an equation (9):

$$E = k \times \left(\frac{V_s}{C_v}\right) \times \left(\frac{\rho}{\rho_0}\right) \times \left(\frac{D_s}{D_0}\right)^2 \times \left(\frac{u_s}{u}\right)^2 \times A \times t \qquad (9)$$

where E denotes the abrasion quantity of the debris flow prevention and control engineering in kg, k denotes an abrasion factor obtained by indoor testing in kg·h$^{-1}$·m$^{-}$2, which is determined based on the indoor testing data, $V_s$ denotes a volume content of solid particles in debris flow on site in percentage, which is the field site data, $\rho$ denotes a density of the debris flow on site in kg/m$^3$, which is the field site data, $D_s$ denotes an average particle size of the solid particles of the debris flow on site in m, which is determined based on the field site data, $u_s$ denotes an on-site debris flow speed in m/s, which is determined based on the field site data, $C_v$ denotes a volume content of solid particles in the debris flow abrasion material in percentage, which is determined based on the indoor testing data, $\rho_0$ denotes a debris flow abrasion material density in kg/m$^3$, which is determined based on the indoor testing data, $D_0$ denotes an average particle size of solid particles in the debris flow abrasion material in m, which is determined based on the indoor testing data, u denotes an abrasion speed of a debris flow abrasion material in m/s, which is determined based on the indoor testing data, A denotes an abrasion area of an engineering structure in m$^2$, which is determined based on the field site data, and t denotes a duration of the abrasion in h, which is determined based on the field site data.

9. The method of claim 8, wherein the abrasion factor k obtained by indoor testing is expressed by an equation (10), $$k = \frac{A_r}{A_0} \qquad (10)$$

where k denotes the abrasion factor obtained by indoor testing in kg·h$^{-1}$·m$^{-2}$, $A_r$ denotes an abrasion rate obtained by indoor testing in kg/h, which is determined based on the indoor testing data, and $A_0$ denotes a testing block abrasion surface area in m$^2$, which is determined based on the indoor testing data.

10. The method of claim 8, wherein in a process of constructing the debris flow abrasion testing experiment, the debris flow abrasion material density $\rho_0$=1900 kg/m$^3$, the abrasion speed of the debris flow abrasion material u=5 m/s, and raw material abrasion particles adopts steel balls with particle sizes of 20 mm.

* * * * *